US009688272B2

(12) United States Patent
Shiraishi

(10) Patent No.: US 9,688,272 B2
(45) Date of Patent: Jun. 27, 2017

(54) SURROUNDINGS MONITORING APPARATUS AND DRIVE ASSISTANCE APPARATUS

(71) Applicant: TOYOTA JIDOSHA KABUSHIKI KAISHA, Toyota-shi, Aichi (JP)

(72) Inventor: Tatsuya Shiraishi, Susono (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 15/095,309

(22) Filed: Apr. 11, 2016

(65) Prior Publication Data
US 2016/0355178 A1    Dec. 8, 2016

(30) Foreign Application Priority Data
Jun. 2, 2015 (JP) ................................. 2015-111926

(51) Int. Cl.
| | |
|---|---|
| *B60W 30/06* | (2006.01) |
| *B60W 30/18* | (2012.01) |
| *G05D 1/00* | (2006.01) |
| *B62D 15/02* | (2006.01) |
| *G08G 1/16* | (2006.01) |

(52) U.S. Cl.
CPC ...... *B60W 30/06* (2013.01); *B60W 30/18163* (2013.01); *B62D 15/0255* (2013.01); *B62D 15/0285* (2013.01); *G05D 1/0088* (2013.01); *B60W 2550/10* (2013.01); *G08G 1/167* (2013.01)

(58) Field of Classification Search
CPC .......... B60W 30/06; B60W 30/18163; B60W 2550/10; G05D 1/0088; B62D 15/0285; B62D 15/0255; G08G 1/167
See application file for complete search history.

(56) References Cited

U.S. PATENT DOCUMENTS

| | | | | |
|---|---|---|---|---|
| 7,908,060 | B2 * | 3/2011 | Basson | ................... G08G 1/166 |
| | | | | 340/435 |
| 8,493,195 | B2 * | 7/2013 | Lee | ........................ B60Q 9/008 |
| | | | | 340/435 |
| 2007/0088474 | A1 * | 4/2007 | Sugiura | ..................... B60R 1/00 |
| | | | | 701/36 |

(Continued)

FOREIGN PATENT DOCUMENTS

| | | |
|---|---|---|
| JP | 08-180300 A | 7/1996 |
| JP | 2009-301400 | * 12/2009 |
| WO | WO2015/181611 A2 | * 12/2015 |

*Primary Examiner* — Michael J Zanelli
(74) *Attorney, Agent, or Firm* — Sughrue Mion, PLLC

(57) ABSTRACT

A surroundings monitoring apparatus includes a detection unit configured to detect information on the surroundings of a host vehicle and a tracking unit configured to track a position and a speed of an obstacle in the surroundings of the host vehicle based on the result of detection by the detection unit. The tracking unit is configured to determine whether or not a tracked first obstacle is entering a blind spot area of the detection unit. In a case where it is determined that the first obstacle is entering the blind spot area of the detection unit and when a tracked second obstacle has passed the blind spot area where the first obstacle entered, the tracking unit determines that the first obstacle is not present in the blind spot area.

3 Claims, 10 Drawing Sheets

(56) References Cited

U.S. PATENT DOCUMENTS

2013/0135089 A1* 5/2013 Sejalon .................... B60R 1/00
340/435
2015/0269844 A1* 9/2015 Arndt ..................... G08G 1/167
340/435

* cited by examiner

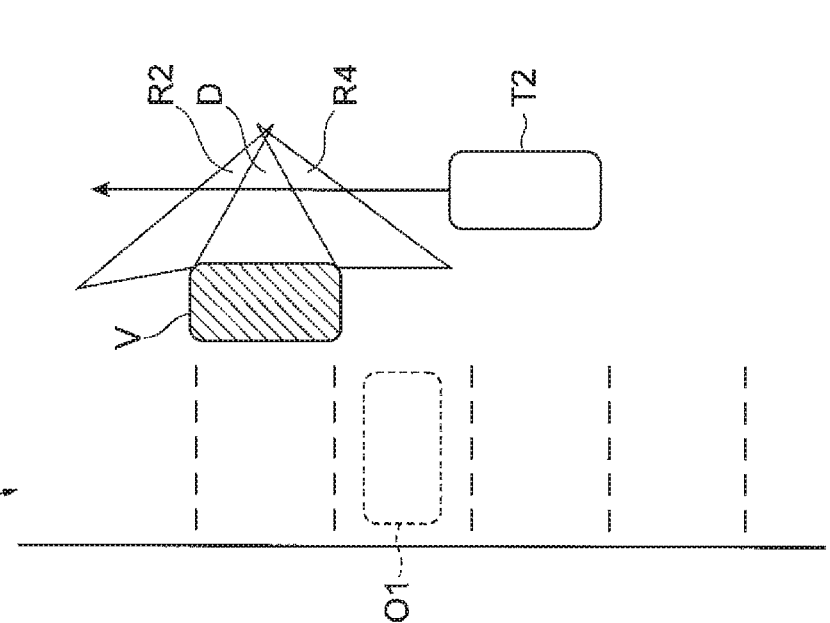
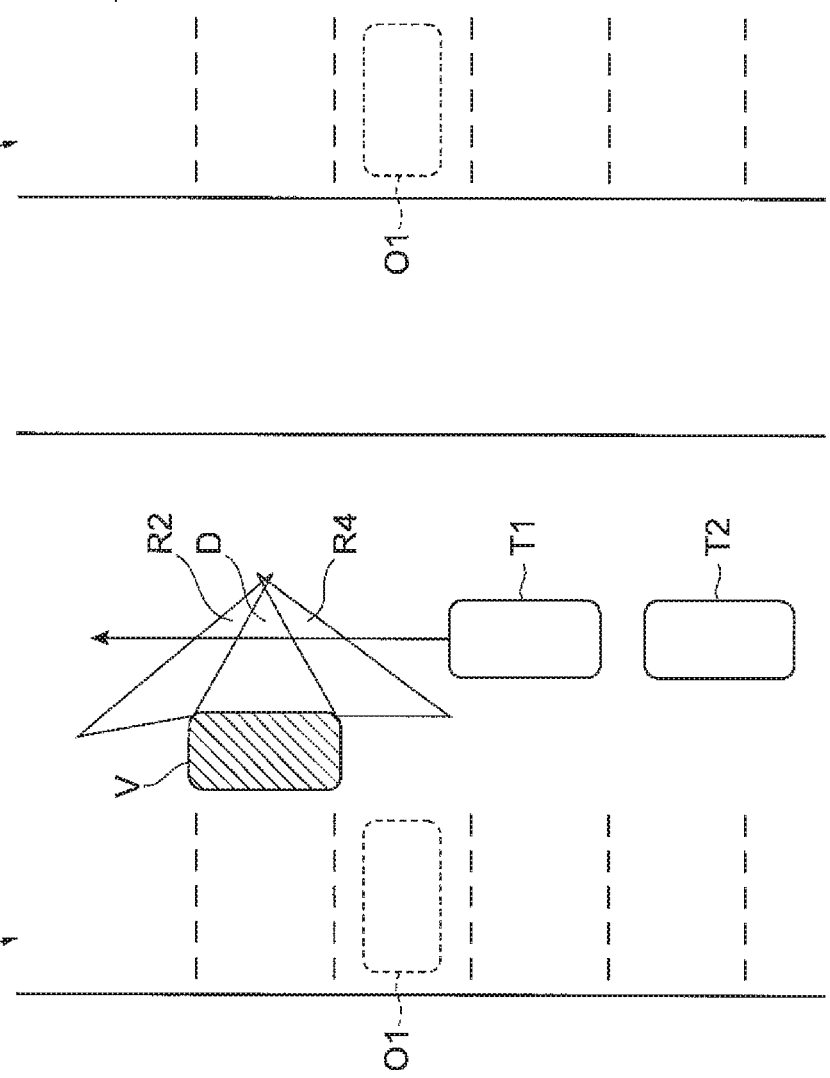

SURROUNDINGS MONITORING APPARATUS AND DRIVE ASSISTANCE APPARATUS

TECHNICAL FIELD

The present invention relates to a surroundings monitoring apparatus and a drive assistance apparatus.

BACKGROUND

As a surroundings monitoring apparatus in the related art, as disclosed in Japanese Unexamined Patent Application Publication No. H08-180300, an apparatus is known, which includes object detection means (detection unit) for detecting the presence or absence of an obstacle existing in front of a host vehicle and complementation means for complementing the detected data for a predetermined period in a case where the detected data from the object detection means is erased.

SUMMARY

In the related art described above, due to characteristics of a detection unit, there is a possibility that the detection unit may erroneously detect one obstacle in the surroundings of the host vehicle as two obstacles. In a case where the obstacle enters a blind spot area of the detection unit in a state of such an erroneous detection, if the obstacle coming out from the blind spot area is correctly detected as one obstacle, there is a possibility that the detection unit may still erroneously recognize that an obstacle is present in the blind spot area despite that actually no obstacle is present in the blind spot area.

An object of the present invention is to provide a surroundings monitoring apparatus and a drive assistance apparatus that can avoid the problem of continuously and erroneously recognizing that an obstacle is present in the blind spot area.

The surroundings monitoring apparatus according to the present invention includes: a detection unit configured to detect information on the surroundings of a host vehicle; and a tracking unit configured to track a position and a speed of an obstacle in the surroundings of the host vehicle based on the results of detection by the detection unit. The tracking unit is configured to determine whether or not a tracked first obstacle is entering a blind spot area of the detection unit, and in a case where it is determined that the first obstacle is entering the blind spot area of the detection unit and when a tracked second obstacle has passed the blind spot area where the first obstacle entered, the tracking unit determines that the first obstacle is not present in the blind spot area.

In a case where the obstacle has passed the blind spot area of the detection unit, it is possible to determine that another obstacle is not present in the blind spot area. Therefore, in the surroundings monitoring apparatus according to the present invention, even in a case where it is determined that the first obstacle tracked by the tracking unit is entering the blind spot area, when the second obstacle tracked by the tracking unit has passed the blind spot area, it is determined that the first obstacle is not present in the blind spot area. In this way, it is possible to avoid the problem of continuously and erroneously recognizing that the obstacle is present in the blind spot area.

A drive assistance apparatus according to the present invention includes: the surroundings monitoring apparatus described above, a vehicle control unit configured to perform a lane change assistance for assisting the host vehicle to change lane from a current lane to an adjacent lane; and a lane changeability determination unit configured to determine whether or not the lane change assistance can be executed. In a case where the tracking unit determines that the first obstacle is entering the blind spot area in the adjacent lane, the lane changeability determination unit determines that the lane change assistance cannot be executed, and in a case where the tracking unit determines that the second obstacle has passed the blind spot area and the first obstacle is not present in the blind spot area, the lane changeability determination unit determines that the lane change assistance can be executed. In a case where the lane changeability determination unit determines that the lane change assistance cannot be executed, the vehicle control unit prohibits the lane change assistance, and in a case where the lane changeability determination unit determines that the lane change assistance can be executed, and in a case where a direction indicator at the adjacent lane side of the host vehicle is in an ON state and a lane change possibility condition is satisfied, the vehicle control unit executes the lane change assistance. According to this drive assistance apparatus, it is possible to suppress the unnecessary prohibition of the lane change assistance.

A drive assistance apparatus according to the present invention includes: the surroundings monitoring apparatus described above; a vehicle control unit configured to perform a parking assistance for assisting the host vehicle to park at a target parking position; and a parking determination unit configured to determine whether or not the parking assistance can be executed. In a case where the tracking unit determines that the first obstacle is entering the blind spot area within a predetermined range set in advance in the surroundings of the host vehicle, the parking determination unit determines that the parking assistance cannot be executed, and in a case where the tracking unit determines that a second obstacle has passed the blind spot area and the first obstacle is not present in the blind spot area, the parking determination unit determines that the parking assistance can be executed. In a case where the parking determination unit determines that the parking assistance cannot be executed, the vehicle control unit prohibits the parking assistance, and in a case where the parking determination unit determines that the parking assistance can be executed and in a case where a parking assistance start switch which starts the parking assistance is in an ON state and the host vehicle is in a state of being stopped, the vehicle control unit executes the parking assistance. According to this drive assistance apparatus, it is possible to suppress the unnecessary prohibition of the parking change assistance.

BRIEF DESCRIPTION OF THE DRAWINGS

FIG. 9A and FIG. 9B are overhead views describing the drive assistance apparatus in FIG. 7.

DETAILED DESCRIPTION

Hereinafter, embodiments of the present invention will be described in detail with reference to the drawings. In the description, the same reference signs will be given to the same or similar elements and the description thereof will not be repeated.

First Embodiment

Figure 1:
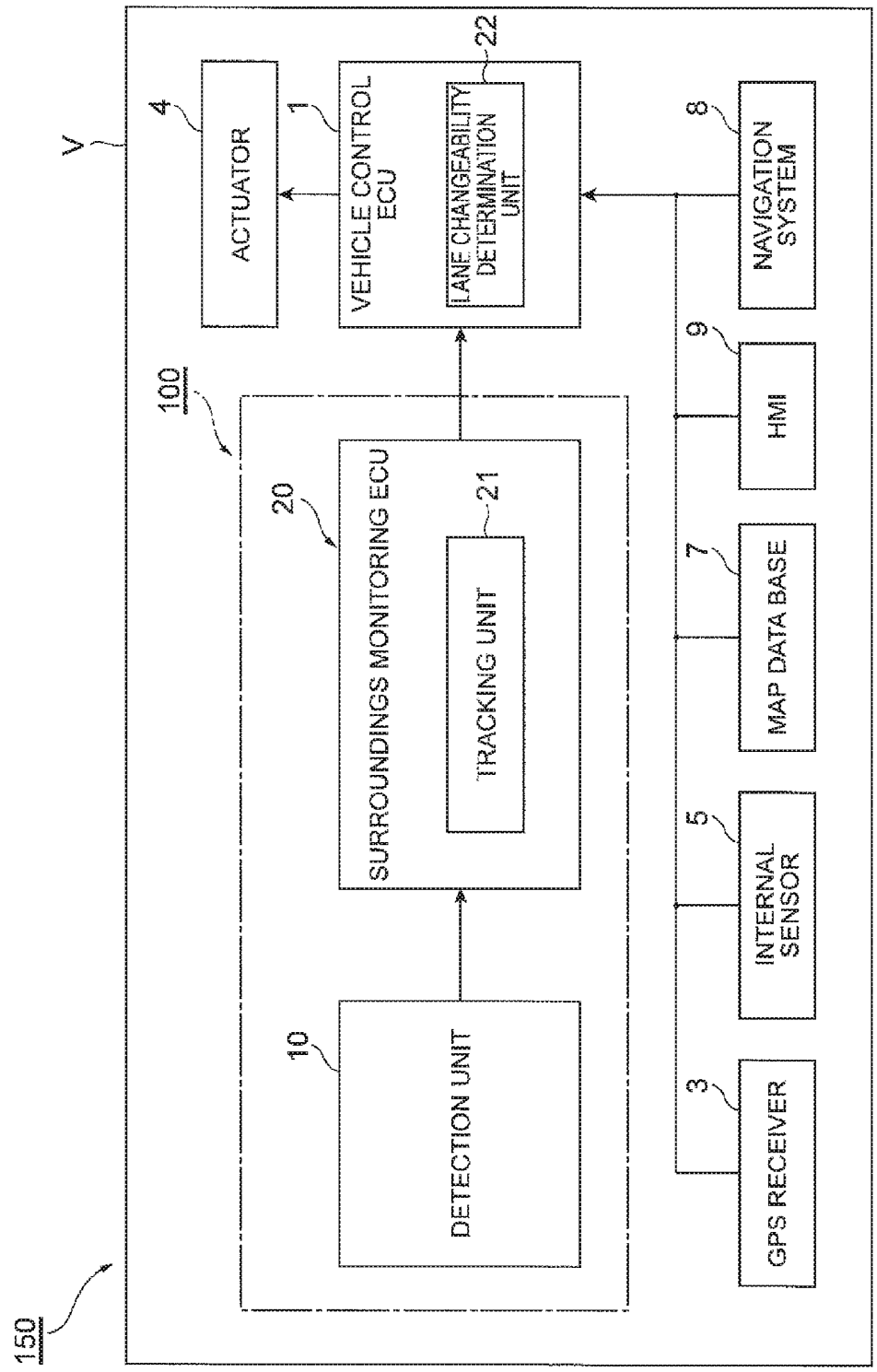
FIG. 1 is a block diagram illustrating a configuration of a surroundings monitoring apparatus and a drive assistance apparatus in a first embodiment.
Figure 2:
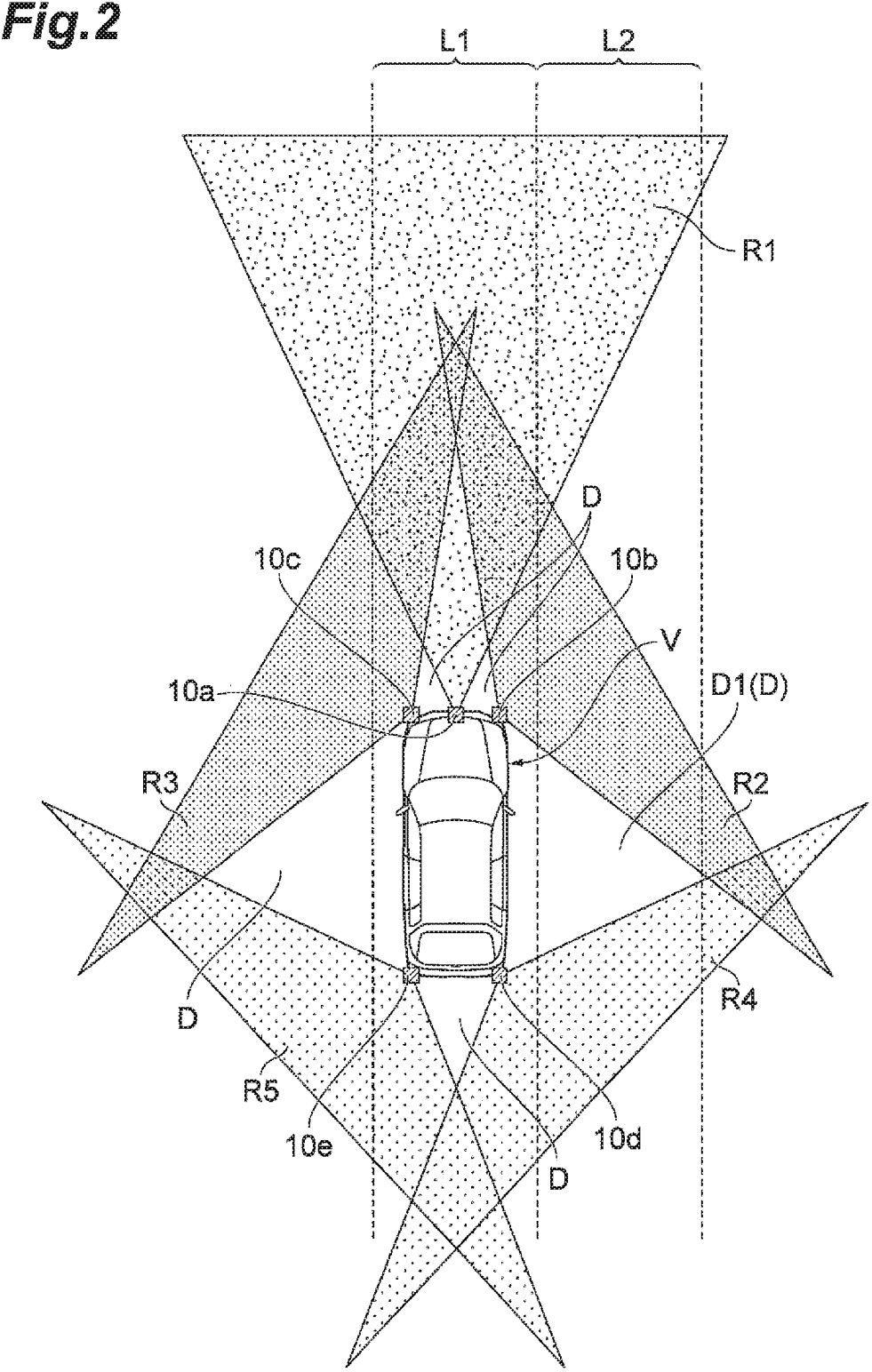
FIG. 2 is a diagram describing a detection unit in FIG. 1.

FIG. 1 is a block diagram illustrating a configuration of a surroundings monitoring apparatus 100 and a drive assistance apparatus 150 in a first embodiment. FIG. 2 is a diagram describing a detection unit 10 in FIG. 1. As illustrated in FIG. 1, the drive assistance apparatus 150 assists the driving of a host vehicle V such as an automobile. The drive assistance apparatus 150 performs a drive assistance (hereinafter, referred to as "lane change assistance") for assisting the host vehicle V to change lane from a current lane to an adjacent lane. The drive assistance apparatus 150 is mounted on the host vehicle V. The drive assistance apparatus 150 includes a GPS receiver 3, an actuator 4, an internal sensor 5, a map database 7, a navigation system 8, a surroundings monitoring apparatus 100, a vehicle control ECU 1, and an HMI 9.

The GPS receiver 3 measures a position (for example, the latitude and the longitude of the host vehicle V) of the host vehicle V by receiving signals from three or more GPS satellites. The GPS receiver 3 transmits the measured position information of the host vehicle V to the vehicle control ECU 1. Instead of the GPS receiver 3, another means for specifying the latitude and the longitude at which the host vehicle V is present may be used.

The actuator 4 is a device that executes an autonomous driving control including the travel control of the host vehicle V. The actuator 4 includes at least a throttle actuator, a brake actuator, and a steering actuator. The throttle actuator controls a supply amount (throttle opening degree) of air to an engine according to a control signal from the vehicle control ECU 1, and controls the driving power of the host vehicle V. In a case where the host vehicle V is a hybrid vehicle or an electric vehicle, the throttle actuator is not included and the driving power is controlled by a control signal from the vehicle control ECU 1 being input to a motor which is a source of the driving power.

The brake actuator controls a brake system according to a control signal from the vehicle control ECU 1 and controls the braking power given to the wheels of the host vehicle V. For example, a hydraulic brake system can be used as the brake actuator. The steering actuator controls the driving of an assist motor that controls a steering torque in the electric power steering system according to a control signal from the vehicle control ECU 1. In this way, the steering actuator controls the steering torque of the host vehicle V.

The internal sensor 5 is a detection device configured to detect a travelling state and a vehicle state of the host vehicle V. The internal sensor 5 includes at least one of a vehicle speed sensor, an acceleration sensor, and a yaw rate sensor. The vehicle speed sensor is a detection device configured to detect the speed of the host vehicle. For example, a wheel speed sensor which detects a rotational speed of the vehicle wheels may be used as the vehicle speed sensor. The wheel speed sensor is provided on vehicle wheels of the host vehicle V or a member such as a drive shaft or the like rotating integrally with the vehicle wheels. The vehicle speed sensor transmits the detected vehicle speed information to the vehicle control ECU 1.

The acceleration sensor is a detection device configured to detect an acceleration of the host vehicle V. The acceleration sensor includes a longitudinal acceleration sensor and a lateral acceleration sensor. The acceleration sensor transmits acceleration information of the host vehicle V to the vehicle control ECU 1. The yaw rate sensor is a detection device configured to detect a yaw rate around the vertical axis of the center of gravity of the host vehicle V (rotational angular velocity). As the yaw rate sensor, for example, a gyro sensor can be used. The yaw rate sensor transmits the detected yaw rate information of the host vehicle V to the vehicle control ECU 1. The internal sensor 5 includes a direction indicator sensor that detects an ON-OFF state of each of the right and left direction indicators of the host vehicle V. The direction indicator sensor transmits the information relating to the detected ON-OFF state of the direction indicators to the vehicle control ECU 1.

The map database 7 is a database in which map information is included. The map database 7 is formed, for example, in a hard disk drive (HDD) mounted on the host vehicle V. In the map information, for example, position information of roads, information on road types (a type of a curve or a straight portion and a curvature of the curve), and information on a number of lanes are included. The map database 7 may be stored in a computer in a facility such as an information processing center which is capable of communicating with the host vehicle V.

The navigation system 8 is a device configured to perform guidance to a destination set by a driver of the host vehicle V for a driver of the host vehicle V. The navigation system 8 calculates a travelling route of the host vehicle V based on the position information of the host vehicle V measured by the GPS receiver 3 and the map information in the map database 7. The route may, for example, be a specified preferable lane in a multi-lane section. The navigation system 8 calculates, for example, a target route from the position of the host vehicle V to the destination and performs notification to the driver by displaying the target route on a display or by a voice output from a speaker. The navigation system 6, for example, transmits the target route information of the host vehicle V to the vehicle control ECU 1. The navigation system 6 may be stored in a computer in a facility such as an information processing center which is capable of communicating with the host vehicle V.

The surroundings monitoring apparatus 100 includes a detection unit 10 and a surroundings monitoring ECU 20. The detection unit 10 detects information on the surroundings of the host vehicle V. The detection unit 10 includes at least one of a camera, radar, and laser imaging detection and ranging (LIDAR). The camera is an imaging device for imaging the external situation of the host vehicle V. The camera transmits the results of imaging to the surroundings monitoring ECU 20 as the information on the surroundings of the host vehicle V.

The radar detects an object outside of the host vehicle V using a radio wave (for example, a millimeter wave). The radar detects the object by transmitting the radio wave to the surroundings of the vehicle V and receiving the wave reflected from the object. The radar transmits the results of detection to the surroundings monitoring ECU 20 as the information on the surroundings of the host vehicle V. The LIDAR detects the object outside the host vehicle V using light. The LIDAR transmits light to the surroundings of the host vehicle V, measures the distance to the reflection point by receiving the light reflected from the object, and then, detects the object. The LIDAR transmits the results of detection to the surroundings monitoring ECU 20 as the information on the surroundings of the host vehicle V. The camera, the LIDAR, and the radar are not necessarily provided in an overlapping manner.

As illustrated in FIG. 1 and FIG. 2, the detection unit 10 includes a front detection unit 10a, a front right side detection unit 10b, a front left side detection unit 10c, a rear right side detection unit 10d, and a rear left side detection unit 10e. The front detection unit 10a detects information on the surroundings of a front area R1 in front of the host vehicle V. The front detection unit 10a is provided on the center of the front end portion of the host vehicle V. The front right side detection unit 10b detects information on the surroundings of a front right side area R2 on a front right side of the host vehicle V. The front right side detection unit 10b is provided on the right side of the front end portion of the host vehicle V. The front left side detection unit 10c detects information on the surroundings of a front left side area R3 on a front left side of the host vehicle V. The front left side detection unit 10c is provided on the left side of the front end portion of the host vehicle V. The rear right side detection unit 10d detects information on the surroundings of a rear right side area R4 on a rear right side of the host vehicle V. The rear right side detection unit 10d is provided on the right side of the rear end portion of the host vehicle V. The rear left side detection unit 10e detects information on the surroundings of a rear left side area R5 on a rear left side of the host vehicle V. The rear left side detection unit 10e is provided on the left side of the rear end portion of the host vehicle V.

The detection unit 10 has a blind spot area D. The blind spot area D is an area in the surroundings of the host vehicle V where the detection unit 10 cannot detect information on the surroundings of the host vehicle V. The blind spot area D is an area having an angle range different from an angle range of the detection unit 10. The blind spot area. D is the area other than the areas R1 to R5 in the surroundings of the host vehicle V. Viewing from the top, the blind spot area D includes an area surrounded by the host vehicle V, the front area R1, and the front right side area R2, an area surrounded by the host vehicle V, the front right side area R2, and the rear right side area R4, an area surrounded by the host vehicle V, the rear right side area R4, and the rear left side area R5, an area surrounded by the host vehicle V, the front left side area R3, and the rear left side area R5, and an area surrounded by the host vehicle V, the front area R1, and the front left side area R3. In the detection unit 10, information on the blind spot area D is set in advance and stored, or is calculated from the results of detection by each of the detection units 10a to 10e and stored. In the present invention, a plurality of detection units 10a to 10e is provided on the host vehicle V. However, the number of units is not limited, and may be one.

The surroundings monitoring ECU 20 is an electronic control unit that performs overall control of the surroundings monitoring apparatus 100. The surroundings monitoring ECU 20 outputs the result of detection by the detection unit 10 to the vehicle control ECU 1. The surroundings monitoring ECU 20 performs processing based on the result of detection by the detection unit 10 and outputs a signal to the vehicle control ECU 1 according to the processing. The surroundings monitoring ECU 20 is an electronic control unit including a central processing unit (CPU), a read only memory (ROM), a random access memory (RAM), and the like. In the surroundings monitoring ECU 20, various controls are performed by loading programs stored in the ROM into the RAM and executing the program by the CPU. The surroundings monitoring ECU 20 may be configured with a plurality of electronic control units.

The surroundings monitoring ECU 20 includes a tracking unit 21. The tracking unit 21 recognizes an obstacle in the surroundings of the host vehicle V based on the result of detection by the detection unit 10. The obstacle is an object that may collide with the host vehicle V. The obstacle includes a fixed obstacle and a moving obstacle. The fixed obstacle is, for example, a building, a wall, and a structure. The fixed obstacle is a stationary obstacle (stationary object) such as a pedestrian, an animal, a bicycle, and another vehicle. The moving obstacle is an obstacle that is moving (moving object) such as a pedestrian, an animal, a bicycle, and another vehicle. The tracking unit 21 recognizes obstacle data of the obstacles surrounding the host vehicle V based on the surroundings information detected by the detection unit 10. The obstacle data includes at least any of a position, a speed, and acceleration and a moving direction of the obstacle.

The tracking unit 21 recognizes first obstacle data which is obstacle data of a first obstacle based on the surroundings information detected by the detection unit 10. The tracking unit 21 recognizes second obstacle data which is obstacle data of a second obstacle based on the surroundings information detected by the detection unit 10. The first obstacles are one or a plurality of obstacles. The second obstacle is another one or a plurality of obstacles other than the first obstacle.

The tracking unit 21 executes processing of determining (hereinafter, referred to as "identical obstacle determination processing") whether or not a tracking target obstacle which has been recognized in the past processing period is an identical target obstacle which is recognized in the current processing period. In a case where the target is determined to be identical, the tracking unit 21 determines that the target is the tracking target obstacle and stores the obstacle data of the accumulated targets in association with the obstacle data of the tracking target obstacle. In this way, the tracking unit 21 tracks the position and the speed of the obstacle. In addition, the tracking unit 21 tracks at any of the acceleration and the moving direction of the obstacle. The method of tracking the obstacle in the tracking unit 21 and the moving direction of the obstacle is not particularly limited, and a known method can be used.

The tracking unit 21 executes the identical obstacle determination processing for determining whether or not the first obstacle which has been recognized in the past processing period is an identical target. In a case where the target is determined to be identical, the tracking unit 21 determines that the target is the first obstacle and stores the Obstacle data of the target as the first obstacle data in association with the first obstacle data. In this way, the tracking unit 21 tracks the position and the speed of the first obstacle. In addition, the tracking unit 21 tracks at least any of the acceleration and the moving direction of the first obstacle. The tracking unit 21 executes the identical obstacle determination processing for determining whether or not the second obstacle which has been recognized in the past processing period is an identical target. In a case where the target is determined to be identical, the tracking unit 21 determines that the target is the second obstacle and stores the obstacle data of the target as the second obstacle data in association with the second obstacle data. In this way, the tracking unit 21 tracks the position and the speed of the position and the speed of the second obstacle. In addition, the tracking unit 21 tracks at least any of the acceleration and the moving direction of the second obstacle. The details of the identical obstacle determination processing will be described below.

The tracking unit 21 determines whether or not the tracked first obstacle is present in an adjacent lane L2 in the surroundings of the host vehicle V (for the details, refer to S1 described below). In a case where it is determined that the tracked first obstacle is present in the adjacent lane L2, the tracking unit 21 sets a flag to be ON. On the other hand, in a case where it is not determined that the tracked first obstacle is present in the adjacent lane L2, the tracking unit 21 sets the flag to be OFF. The flag is a parameter indicating that the first obstacle is present in the adjacent lane L2 in the surroundings of the host vehicle V. The flag is a parameter for determining whether or not the lane change assistance can be executed. The flag becomes ON (=1) when a condition for the first obstacle being present in the adjacent lane L2 in the surroundings of the host vehicle V is satisfied, and becomes OFF (=0) when the condition is not satisfied.

The tracking unit 21 determines whether or not the tracked first obstacle enters a blind spot area D1 in the adjacent lane L2. The blind spot area D1 is a blind spot area existing on the side of the adjacent lane L2 side in the surroundings of the host vehicle V among a plurality of blind spot areas D. The blind spot area D1 is a blind spot area having an area that overlaps the adjacent lane L2. For example, the blind spot area D1 can be specified from the plurality of blind spot areas D as follows. That is, the adjacent lane L2 which is the destination of the lane change is recognized based on the ON state of the direction indicator (result of detection by the internal sensor 5) at the adjacent lane L2 side. Based on the recognition result, the blind spot area D1 can be specified from the plurality of blind spot areas D.

In a case where the tracked first obstacle is lost (missed) in the vicinity of the blind spot area D1 and the lost state continues, the tracking unit 21 determines that the first obstacle enters the blind spot area D1. For example, the tracking unit 21 determines whether or not the first obstacle in the vicinity of the blind spot area D1 which has been recognized in the past processing period is recognized in the current processing period. In a case where the first obstacle is recognized in the current processing period, the tracking unit 21 does not determine that the first obstacle enters the blind spot area D1. On the other hand, in a case where the first obstacle is not recognized in the current processing period, the tracking unit 21 predicts a current position of the first obstacle from the first obstacle data in the past processing period. In a case where it is predicted that the first obstacle is positioned in the blind spot area D1, the tracking unit 21 determines that the first obstacle enters the blind spot area D1. In a case where it is not predicted that the first obstacle is positioned in the blind spot area D1, the tracking unit 21 determines that the first obstacle has not entered the blind spot area D1. In the vicinity of the blind spot area D1 is, for example, a position on a boundary line of the blind spot area D1. In the vicinity of blind spot area D1 are a position of a rear side edge in the front right side area R2 and a position of a front side edge in the rear right side area R4. The method of determining whether or not the first obstacle enters the blind spot area D1 is not limited, and a known method can be used.

In a case where it is determined that the tracked first obstacle enters the blind spot area D1, the tracking unit 21 sets the flag to be ON. On the other hand, in a case where it is not determined that the tracked first obstacle enters the blind spot area D1, the tracking unit 21 sets the flag to be OFF.

The tracking unit 21 determines whether or not the tracked second obstacle has passed the blind spot area D1. Details of passing determination processing of determining whether or not the second obstacle has passed the blind spot area D1 will be described below. When it is determined that the second obstacle has passed the blind spot area D1, the tracking unit 21 sets the flag to be OFF. That is, when the tracked second obstacle has passed the blind spot area D1, the tracking unit 21 determines that the first obstacle is not present in the blind spot area D1. In this way, the tracking unit 21 outputs flag information relating to the ON-OFF state (whether the flag is the ON state or the OFF state) of the flag to the vehicle control ECU 1.

The vehicle control ECU (vehicle control unit) 1 is an electronic control unit including a CPU, ROM, RAM, and the like. In the vehicle control ECU 1, various controls are performed by loading a program stored in the ROM into the RAM and executing the program by the CPU. The vehicle control ECU 1 may be configured with a plurality of electronic control units.

The vehicle control ECU 1 performs a vehicle control which the lane change assistance is executed in changing a lane from a current lane L1 to an adjacent lane L2. The lane change assistance is an assistance to cause the host vehicle V to autonomously travel and to autonomously change the lane in which the host vehicle V travels from the current lane L1 to the adjacent lane L2. The current lane L1 is a lane in which the host vehicle V currently travels. The adjacent lane L2 is a lane adjacent to the current lane L1. The adjacent lane L2 is a lane in which the host vehicle V travels after the lane change, and the information on the current lane L1 and the adjacent lane L2 (a type of the lane line, a shape of the road, a lane width, and the like) can be recognized by a known method such as a lane line recognition method based on the surroundings information detected by the detection unit 10.

The vehicle control ECU 1 includes a lane changeability determination unit 22. The lane changeability determination unit 22 determines whether or not the lane change assistance can be executed based on the flag information from the surroundings monitoring apparatus 100. In a case where the flag information indicates the OFF state, the lane changeability determination unit 22 determines that the lane change assistance can be executed. In a case where the flag information indicates the ON state, the lane changeability determination unit 22 determines that the lane change assistance cannot be executed.

In a case where the lane changeability determination unit 22 determines that the lane change assistance cannot be executed, if the lane change assistance is under execution, the vehicle control ECU 1 stops the lane change assistance.

In a case where the lane changeability determination unit 22 determines that the lane change assistance cannot be executed, if the lane change assistance is not under execution, the vehicle control ECU 1 causes the lane change assistance not to start. That is, in a case where the lane changeability determination unit 22 determines that the lane change assistance cannot be executed, the vehicle control ECU 1 prohibits the lane change assistance.

In a case where the lane changeability determination unit 22 determines that the lane change assistance can be executed, and when the direction indicator at the adjacent lane L2 side is in the ON state and a lane change possibility condition is satisfied, the vehicle control ECU 1 generates a path for the host vehicle to change the lane from the current lane L1 to the adjacent lane L2, and generates a travel plan according to the generated path.

The ON or OFF state of the direction indicator at the adjacent lane L2 side can be determined based on the result of detection by the internal sensor 5. The lane change possibility condition can be determined based on the position information of the host vehicle V from the GPS receiver 3, the result of detection by the internal sensor 5, and the surroundings information from the surroundings monitoring apparatus 100. For example, a case where the adjacent lane L2 is present, the lane line at the adjacent lane L2 side is white line or a solid line, and the current lane L1 is not a branch path and the speed of the host vehicle V is equal to or higher than 60 km/h is assumed to be the lane change possibility condition. The lane change possibility condition is not particularly limited, and a known condition can be applied.

The path and the travel plan of the host vehicle V is generated based on the target route from the navigation system 8, the position information of the host vehicle V from the UPS receiver 3, the result of detection by the internal sensor 5, and the surroundings information from the surroundings monitoring apparatus 100. The travel plan is output as a plan having a combination of two elements of a target position p on a coordinate system which is fixed to the path of the host vehicle V and a target speed v at each target position, that is, a plurality of configuration coordinates (p, v). Each target position p has at least information of the x and y coordinates on the coordinate system fixed on the host vehicle V or information equivalent thereto. The travel plan is not particularly limited as long as the travel plan describes the behavior of the host vehicle V.

Usually, it is sufficient that the travel plan is data of roughly a few seconds from the current time, and sometimes a data of several tens of seconds is needed depending on the situation such as a right turn at the intersection or the overtaking of the vehicle. Therefore, it is preferable that the number of configuration coordinates of the travel plan is variable and a distance between the configuration coordinates is also variable. Furthermore, a curve connecting the configuration coordinates may be approximated by a spline function or the like, and then, the parameters of the curve may be used as the travel plan. Any arbitrary known method can be used for the generation of the travel plan as long as the behavior of the vehicle can be indicated.

The travel plan includes a standard speed pattern indicating a trend of the speed of the host vehicle and a standard steering pattern indicating a trend of steering torque when the vehicle travels on the path along the target route. The standard speed pattern and the standard steering pattern are the data set in association with a time for each control position with respect to the control position set on the path at a predetermined interval (for example, one meter). The standard speed pattern is a vehicle speed data that causes the host vehicle to autonomously travel at a target speed set in advance. The target speed is a speed at which the host vehicle suitably travels on the path in light of criteria such as the safety, the legal compliance, or the travelling efficiency. The standard steering pattern is a steering torque data that causes the host vehicle to autonomously travel along the target lateral position of the path.

The vehicle control ECU 1 outputs a control signal causing the host vehicle V to autonomously change the lane along the travel plan to the actuator 4, and executes the lane change assistance. Then, in a case where a shifted amount of the host vehicle V from the center of the adjacent lane L2 is smaller than a certain value (for example, 0.2 meter), the vehicle control ECU 1 regards the lane change being finished and turns off the direction indicator. The method of the vehicle control in the lane change assistance lane change assistance is not particularly limited, and a known method can be used.

The HMI 9 is an interface that performs input and output of the information between occupants (including the driver) of the host vehicle V and the drive assistance apparatus 150. The HMI 9 includes, for example, a display panel for displaying the image information for the driver, a speaker for audio output, and an operation button or a touch panel for the driver to perform the input operation. For example, when an input operation for starting or stopping the lane change assistance is performed by the occupant, the HMI 9 outputs a signal to the vehicle control ECU 1, and start or stops the lane change. The HMI 9 may perform the outputting of the information using a wirelessly connected mobile information terminal. The HMI 9 may receive an input operation of the occupant using the mobile information terminal.

Next, processing tasks executed by the surroundings monitoring apparatus 100 and the drive assistance apparatus 150 will be described in detail.

Figure 3A:
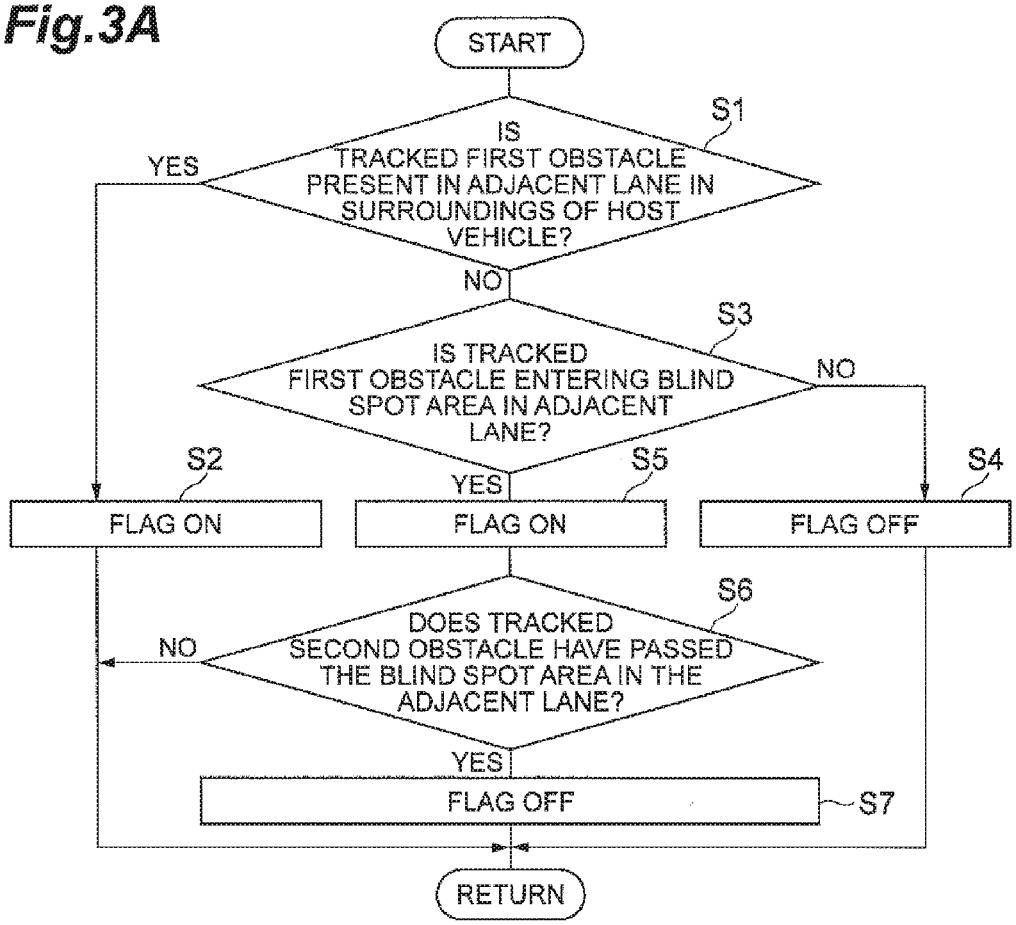
FIG. 3A is a flowchart illustrating processing of a tracking unit in FIG. 1.

FIG. 3A is a flowchart illustrating processing of a tracking unit 21 in FIG. 1. As illustrated in FIG. 3A, the tracking unit 21 executes following processing, for example, during the travelling of the host vehicle V. That is, the tracking unit 21 determines whether or not the tracked first obstacle is present in the adjacent lane L2 in the surroundings of the host vehicle V (S1). For example, in S1, it is determined whether or not the first obstacle is tracked. In a case where the first obstacle is tracked, it is determined that the tracked first obstacle is present in the adjacent lane L2 in the surroundings of the host vehicle V when an absolute value of the lateral position of the first obstacle with respect to the host vehicle V is smaller than a lateral position threshold value and when a distance between the host vehicle V and the first obstacle is shorter than a distance threshold value. The lateral position threshold value corresponds to a furthest lateral position of the first obstacle on which, for example, the first obstacle can be present in the adjacent lane L2. The distance threshold value corresponds to a maximum range surrounding the host vehicle V in which, for example, the host vehicle V changing the lane can influence the traffic flow. The lateral position threshold value and the distance threshold value can be set in advance by a measurement, an experience, a simulation, or the like.

In a case of YES in S1 described above, the flag is set to be ON (S2). In a case of NO in S1 described above, it is determined whether or not the tracked first obstacle is entering the blind spot area D1 in the adjacent lane L2 (S3). In a case of NO in S3 described above, the flag is set to be OFF (S4). In a case of YES in S3 described above, the flag is set to be ON (S5).

After S5 described above, it is determined whether or not the tracked second obstacle has passed the blind spot area D1 in the adjacent lane L2 (S6). In S6 described above, whether or not the second obstacle has passed the blind spot area D1 is determined by the tracking unit 21 performing the determination processing of passing the blind spot area.

Figure 4:
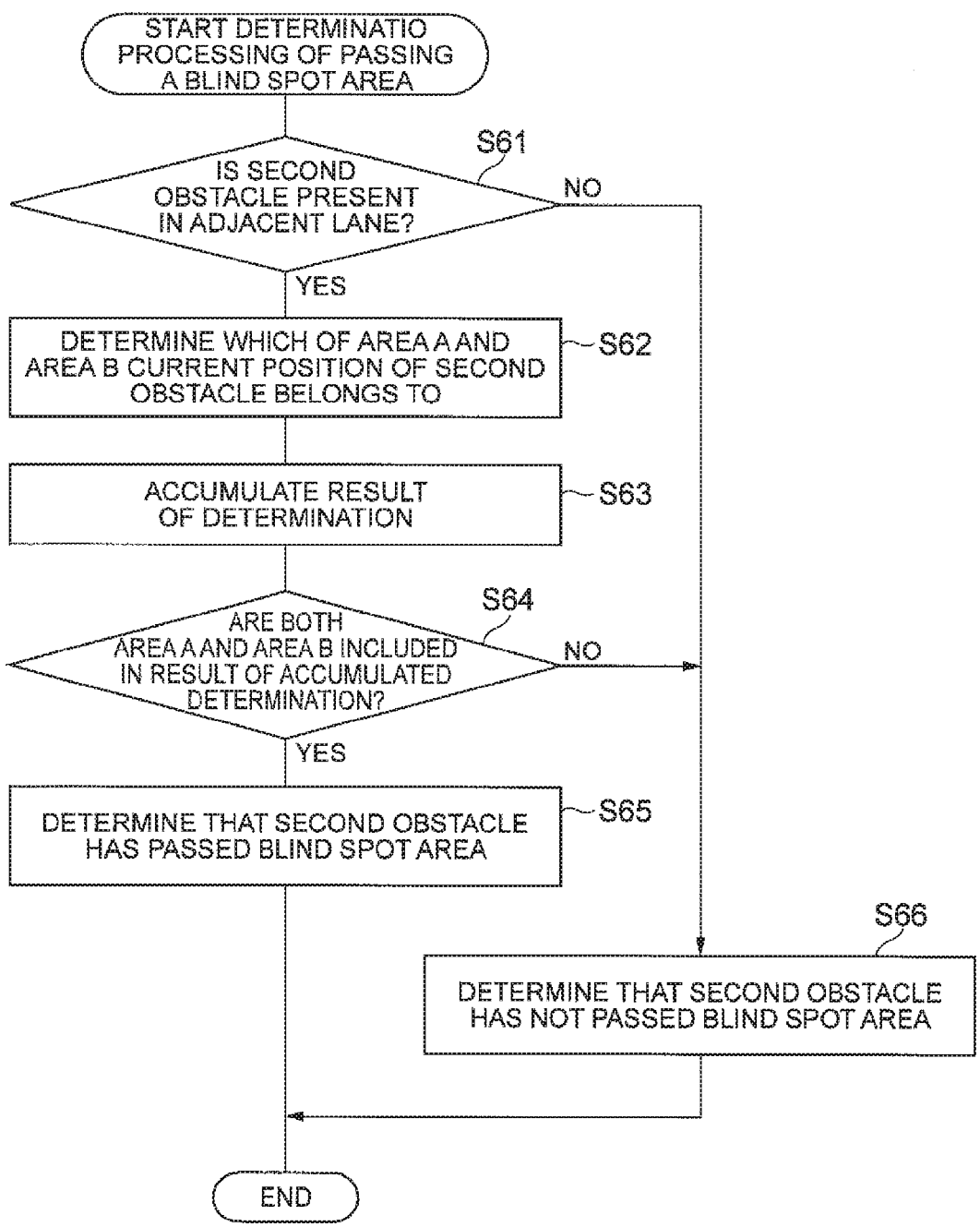
FIG. 4 is a flowchart illustrating determination processing of passing a blind spot area in a surroundings monitoring ECU in FIG. 1.
Figure 5:
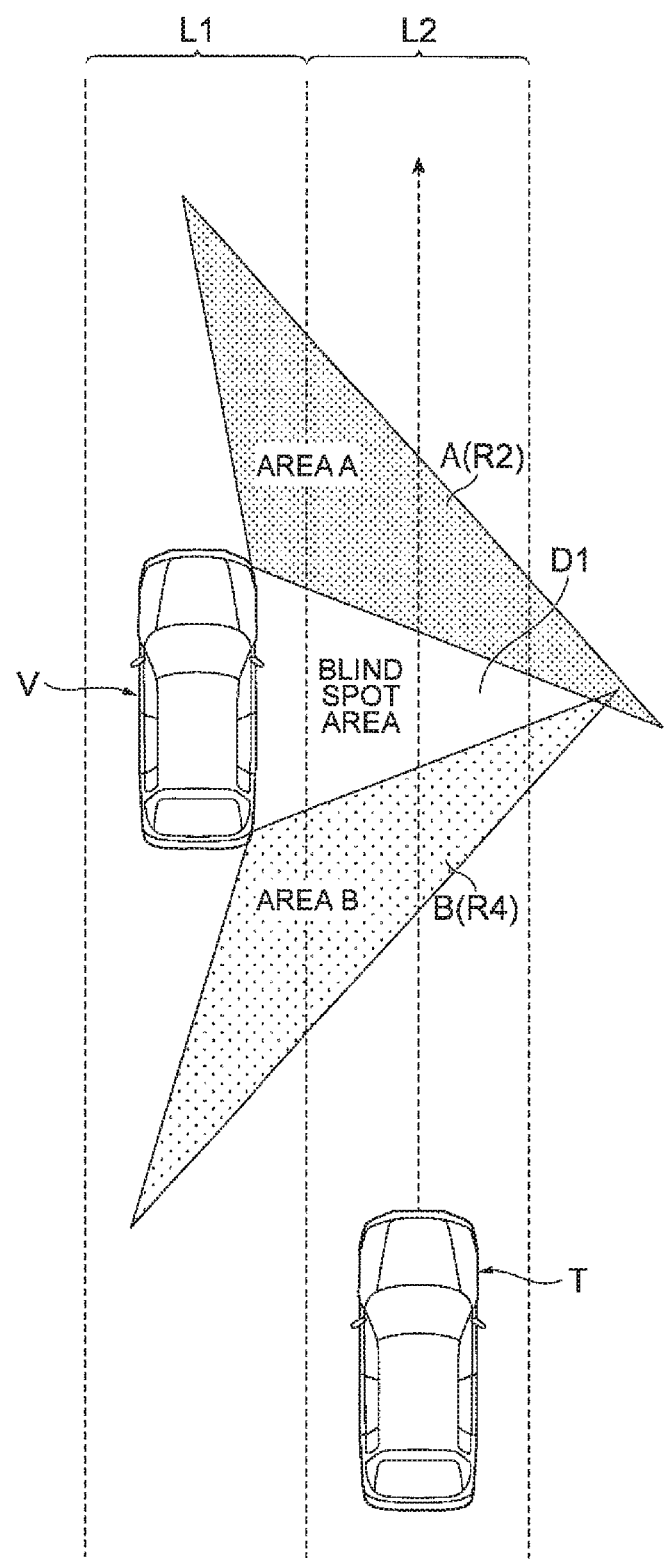
FIG. 5 is a diagram describing the determination processing of passing a blind spot area in the surroundings monitoring ECU in FIG. 1.

FIG. 4 is a flowchart illustrating determination processing of passing the blind spot area. FIG. 5 is a diagram describing the determination processing of passing a blind spot area. As illustrated in FIG. 4 and FIG. 5, in the determination processing of passing a blind spot area, it is determined whether or not the tracked second obstacle T is present in the adjacent lane L2 (S61). For example, in S61 described above, it is determined whether or not the second obstacle T is tracked. In a case where it determined that the second obstacle T is tracked, when an absolute value of the lateral position of the second obstacle T is smaller than the lateral position threshold value described above, it is determined that the second obstacle T is present in the adjacent lane L2.

In a case of YES in S61, it is determined which of an area A and an area B the current position of the second obstacle T belongs to based on the second obstacle data (S62). The area A and the area B represent a position relationship of the second obstacle T with respect to the blind spot area D1. The area A is an area in front of the blind spot area D1. Here, the area A corresponds to the front right side area R2 which is the area detected by the front right side detection unit 10b. The area B is an area behind the blind spot area D1. Here, the area B corresponds to the rear right side area R4 which is the area detected by the rear right side detection unit 10d. Then, the result of the determination in S62, that is, which of the area A and the area B the position of the second obstacle T belongs to is stored and accumulated (S63).

It is determined whether or not there are both the area A and the area B in the result of determination accumulated in S63 (S64). For example, in S64 described above, it is determined whether or not both the area A and the area B are included, in the history of the result of determination in above-described S63 stored in association with the tracked second obstacle T as well as whether only the area A or only the area B are included. In a case of YES in S64 described above, it is determined that the second obstacle T has passed the blind spot area D1 (S65). In a case of NO in S61 described above or in S64 described above, it is determined that the tracked second obstacle T has not passed the blind spot area D1 (S66). Then, the determination processing of passing the blind spot area ends. Returning to FIG. 3A and FIG. 3B, in a case of YES in S6 described above, the flag is set to be OFF (S7). After ending S7 described above, the process returns to S1 described above, and is repeatedly executed.

Figure 3B:
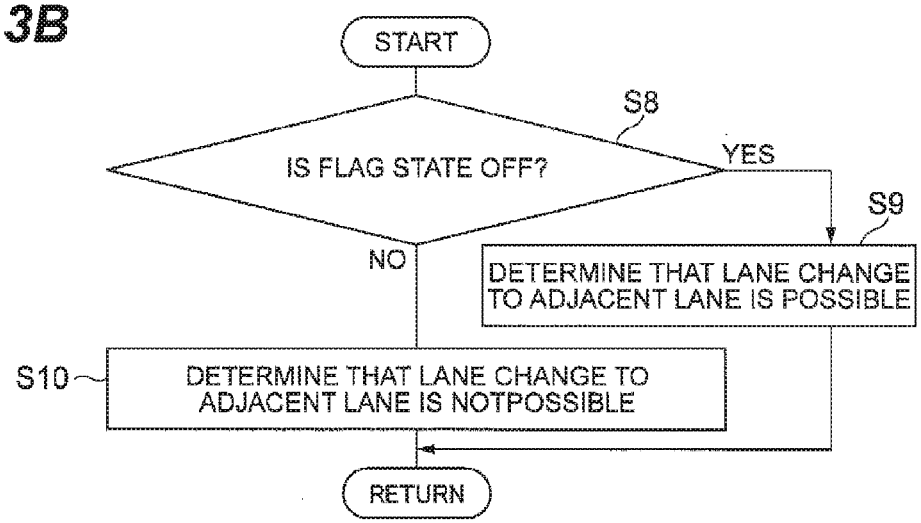
FIG. 3B is a flowchart illustrating processing of a lane changeability determination unit in FIG. 1.

FIG. 3B is a flowchart illustrating processing of a lane changeability determination unit 22 in FIG. 1. As illustrated in FIG. 3B, for example, following processing is executed by the lane changeability determination unit 22 during the travelling of the host vehicle V. That is, it is determined whether the current state of the flag is ON or OFF state (S8). In a case of YES in S8 described above, it is determined that the lane change assistance can be executed (S9). In a case of NO in S8 described above, it is determined that the lane change assistance cannot be executed (S10). After S10 described above, the process returns to above-described S8 again, and is repeatedly executed.

Figure 6:
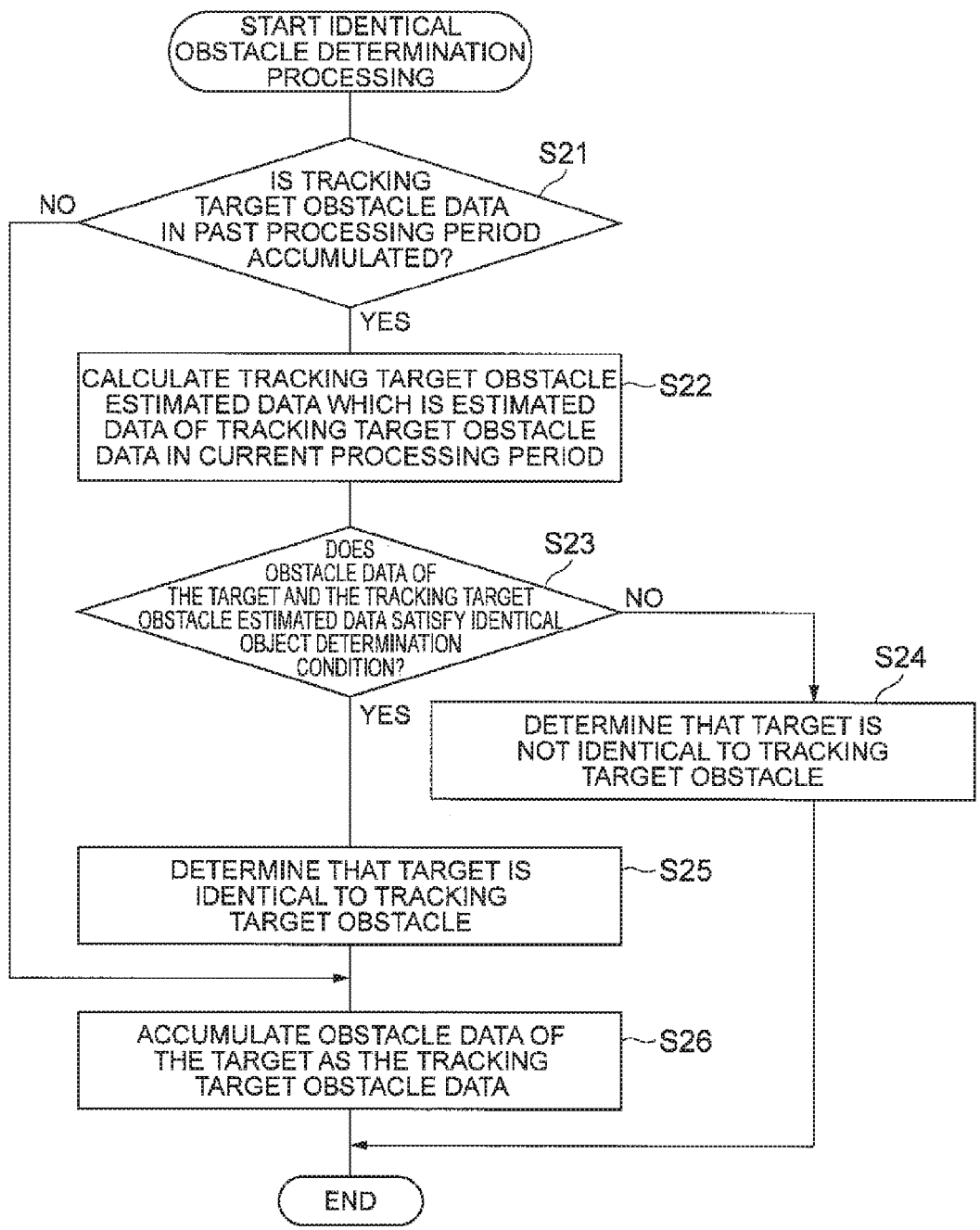
FIG. 6 is a flowchart describing identical obstacle determination processing in the surroundings monitoring ECU in FIG. 1.

FIG. 6 is a flowchart describing identical obstacle determination processing. In the surroundings monitoring apparatus 100, in a case where an obstacle is recognized, the tracking unit 21 executes following identical obstacle determination processing. That is, firstly, with regard to a tracking target obstacle which is a target for determination of whether or not the obstacle is identical, it is determined whether or not the obstacle data in the past processing period is accumulated (S21). The obstacle data of the tracking target obstacle will be referred to as a tracking target obstacle data.

In a case of YES in S21 described above, an estimated data of the tracking target obstacle data (hereinafter, referred to as a "tracking target obstacle estimated data") in the current processing period is calculated based on the tracking target obstacle data in the accumulated in the past processing period (S22). In S22 described above, the tracking target obstacle estimated data can be estimated using, for example, a known method from the position, speed, acceleration, and the moving direction of the tracking target obstacle in the past processing period.

It is determined whether or not the obstacle data of the target which is the obstacle recognized in the current processing period and the tracking target obstacle estimated data estimated in S22 described above satisfy an identical object determination condition described below (S23). A first distance, a second distance, a first speed, and a second speed are values set in advance for appropriately executing identical obstacle determination processing, and may be fixed values or may be varying values. The first distance, the second distance, the first speed and the second speed can be obtained by a measurement, experiment, an experience, a simulation, or the like in the identical obstacle determination processing.

identical object determination condition:

|difference of the distance between the target and the tracking target obstacle|<first distance, and

|difference of the lateral position between the target and the tracking target obstacle|<second distance, and

|difference of the speed between the target and the tracking target obstacle|<first speed, and

|difference of the speed in the lateral direction between the target and the tracking target obstacle|<second speed.

In a case of NO in S23 described above, it is determined that the target is not identical to the tracking target obstacle (S24). In a case of YES in S23 described above, it is determined that the target is identical to the tracking target obstacle (S25). In a case of NO in S21 described above or after S25, the obstacle data of the target is stored and accumulated as the tracking target obstacle data in the current processing period (S26). For example, in S26 described above, the obstacle data of the target is stored in association with the tracking target obstacle data in the past processing period, and the tracking target obstacle data is updated. Then, the identical obstacle determination processing ends.

As described above, the surroundings monitoring apparatus 100 includes the tracking unit 21 that tracks the position and the speed of the obstacle in the surroundings of the host vehicle V based on the result of detection by the detection unit 10 that detects the information on the surroundings of the host vehicle V. In a case where the obstacle has passed the blind spot area D1 of the detection unit 10, it is possible to determine that another obstacle is not present in the blind spot area D1. Therefore, in the tracking unit 21 of the surroundings monitoring apparatus 100, even in a case where it is determined that the tracked first obstacle is entering the blind spot area D1, when the tracked second obstacle has passed the blind spot area D1, it is determined that the first obstacle is not present in the blind spot area D1.

In this way, it is possible to avoid the problem of continuously erroneously recognizing that the obstacle is present in the blind spot area D1.

The drive assistance apparatus 150 includes the surroundings monitoring apparatus 100, the vehicle control ECU 1 that performs the lane change assistance, and the lane changeability determination unit 22 that determines whether or not the lane change assistance is possible. In a case where the tracking unit 21 determines that the first obstacle enters the blind spot area D1 in the adjacent lane L2, the lane changeability determination unit 22 determines that the lane change assistance cannot be executed. On the other hand, even in a case where the tracking unit 21 determines that the first obstacle enters the blind spot area D1 in the adjacent lane L2, in a case where it is determined that the second obstacle has passed the blind spot area D1 and the first obstacle is present is not present in the blind spot area D1, the lane changeability determination unit 22 determines that the lane change assistance can be executed. In a case where it is determined that the lane change assistance cannot be executed, the vehicle control ECU 1 prohibits the lane change assistance. In a case where it is determined that the lane change assistance cannot be executed, and in a case where the direction indicator at the adjacent lane L2 side is in the ON state and the lane change possibility condition is satisfied, the vehicle control ECU 1 executes the lane change assistance. In this way, it is possible to suppress the unnecessary prohibition (cancellation) of the lane change assistance.

Second Embodiment

Next, a second embodiment will be described. In the description of the present embodiment, points that are different from those in the first embodiment will be described, and the repeated descriptions thereof will be omitted.

Figure 7:
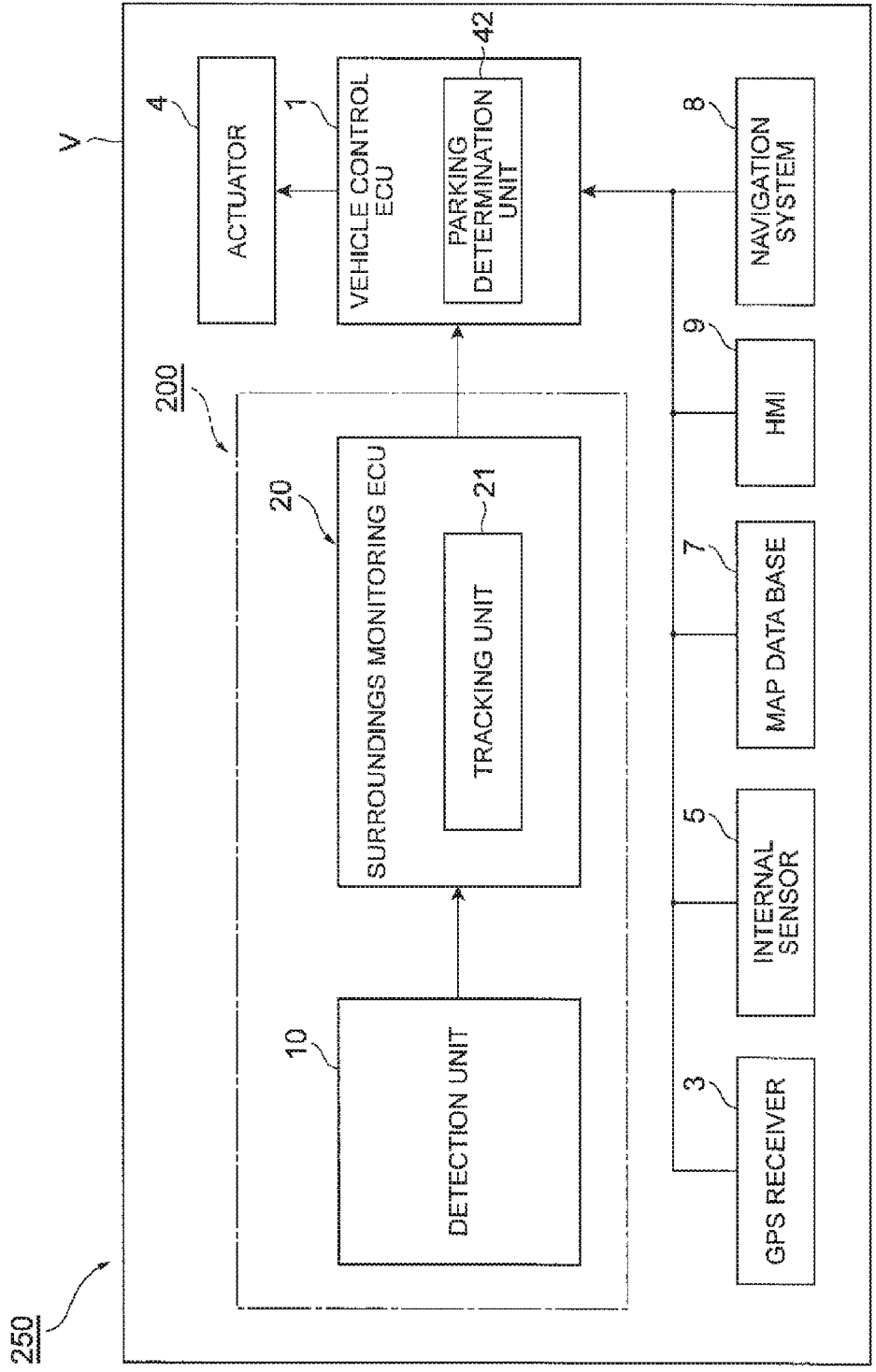
FIG. 7 is a block diagram illustrating a configuration of a surroundings monitoring apparatus and a drive assistance apparatus in a second embodiment.

FIG. 7 is a block diagram illustrating a configuration of a surroundings monitoring apparatus 200 and a drive assistance apparatus 250 in the second embodiment. As illustrated in FIG. 7, the drive assistance apparatus 250 in the present embodiment performs a drive assistance to autonomously park the host vehicle V in a target parking position (hereinafter, referred to as "parking assistance"). The drive assistance apparatus 250 includes a surroundings monitoring apparatus 200 having a detection unit 10 and a surroundings monitoring ECU 20.

The tracking unit 21 in the surroundings monitoring apparatus 200 determines whether or not a tracked first obstacle is present within a predetermined range of the surroundings of the host vehicle V based on the surroundings information from the detection unit 10. In a case where it is determined that the tracked first obstacle is present within the predetermined range of the surroundings of the host vehicle V, the flag is set to be ON. The predetermined range of the surroundings of the host vehicle V is a range set in advance. In the predetermined range of the surroundings of the host vehicle V when an obstacle is present within the range, it becomes difficult to appropriately execute the parking assistance due to interference between the host vehicle V and the obstacle at the time of the parking assistance. In an overhead view, the predetermined range of the surroundings of the host vehicle V is a range expanding from the host vehicle V. In an overhead view, the predetermined range of the surroundings of the host vehicle V is a range surrounding the host vehicle V while a certain distance being away from the host vehicle V. The predetermined range is not limited thereto and may be obtained by a measurement, experiment, an experience or a simulation, or the like. The flag is a parameter indicating that the first obstacle is present in the predetermined range of the surroundings of the host vehicle V. The flag is a parameter for determining whether or not the parking assistance can be executed. The flag is set to be ON (=1) when the condition for first obstacle being present in the predetermined range of the surroundings of the host vehicle V is satisfied, and is set to be OFF (=0) when the condition is not satisfied.

The tracking unit 21 determines whether or not the tracked first obstacle is entering the blind spot area D within the predetermined range of the surroundings of the host vehicle V (hereinafter, referred to as "blind spot area within the predetermined range"). In a case where it is determined that the tracked first obstacle is entering the blind spot area D within the predetermined range, the tracking unit 21 sets the flag to be ON. On the other hand, in a case where it is not determined that the tracked first obstacle is entering the blind spot area D within the predetermined range, the tracking unit 21 sets the flag to be OFF.

The tracking unit 21 executes the above-described passing determination processing that determines whether or not the tracked second obstacle has passed the blind spot area D within the predetermined range. When it is determined that the tracked second obstacle has passed the blind spot area D within the predetermined range, the tracking unit 21 sets the flag to be OFF. That is, when the tracked second obstacle has passed the blind spot area D within the predetermined range, the tracking unit 21 determines that the first obstacle is not present in the blind spot area D within the predetermined range.

The vehicle control ECU 1 in the present embodiment performs the vehicle control to execute the parking assistance. The vehicle control ECU 1 includes a parking determination unit 42. The parking determination unit 42 determines whether or not the parking assistance can be executed based on flag information from the surroundings monitoring apparatus 200. In a case where the flag is in OFF state, the parking determination unit 42 determines that the parking assistance can be executed. In a case where the flag is in the ON state, the parking determination unit 42 determines that the parking assistance cannot be executed.

In a case where the parking determination unit 42 determines that the parking assistance cannot be executed, if the parking assistance is under execution, the vehicle control ECU 1 stops the parking assistance. In a case where the parking determination unit 42 determines that the parking assistance cannot be executed, and if the parking assistance is not under execution, the vehicle control ECU 1 makes the parking assistance not start. That is, in a case where the parking determination unit 42 determines that the parking assistance cannot be executed, the vehicle control ECU 1 prohibits the parking assistance.

In a case where the parking determination unit 42 determines that the parking assistance can be executed, and in a case where a parking assistance start switch included in the HMI 9 is in the ON state and the host vehicle V is in a stop state (that is, the vehicle speed=0), the vehicle control ECU 1 generates a path for the host vehicle V from the current position to the target parking position, and generates a travel plan according to the generated path. The route may include one or a plurality of stop positions (turning positions) in addition to the target parking position.

The parking assistance start switch is an operation unit that performs an operation of starting the parking assistance. The parking assistance start switch may be a device that switches a state between the ON state and the Off state by operating a button or a lever, or may be a monitor configuring a touch panel, or may be a device that switches the state between the ON state and the Off state by voice recognition. The vehicle control ECU 1 can determine whether the parking assistance start switch is in the ON state or in the OFF state based on the output from the HMI 9. The vehicle control ECU 1 recognizes the vehicle speed of the host vehicle V from the result of detection by the internal sensor 5 and can determine whether or not the host vehicle V is in stop state based on the vehicle speed. The vehicle control ECU 1 can determine whether or not the obstacle is present within the predetermined range of the surroundings of the host vehicle V based on the surroundings information from the surroundings monitoring apparatus 200.

The vehicle control ECU 1 determines the target parking position based on the surroundings information from the surroundings monitoring apparatus 200. As an example, the vehicle control ECU 1 creates a grid map of the surroundings of the host vehicle V, and determines a predetermined position in a suitable parking space in the surroundings of the host vehicle V as the target parking position based on a parking stall line or a tire stop on the grid map. The vehicle control ECU 1 may determine the target parking position using, for example, the HMI 9 providing candidates for the target parking position which can be the suitable parking space to the driver and causing the driver to select the target parking position.

The vehicle control ECU 1 outputs a control signal causing the host vehicle V to park according to the travel plan to the actuator 4 such that the parking assistance is executed. The vehicle control method is not particularly limited and a known method can be used.

Next, the processing tasks executed in the surroundings monitoring apparatus 200 and the drive assistance apparatus 250 will be described in detail.

Figure 8A:
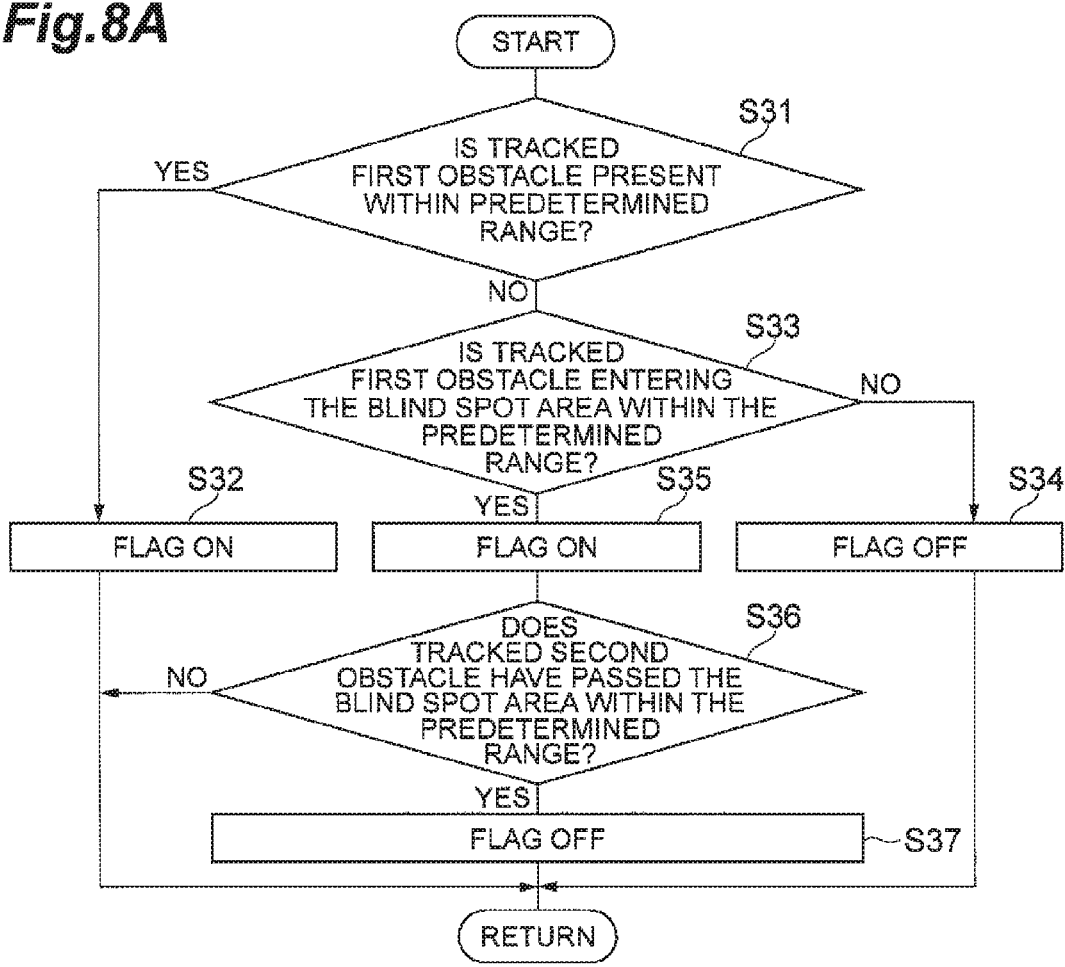
FIG. 8A is a flowchart illustrating processing of a tracking unit in FIG. 7.

FIG. 8A is a flowchart illustrating processing of a tracking unit 21 in FIG. 7. As illustrated in FIG. 8A, the tracking unit 21 executes the following processing. That is, it is determined whether or not the tracked first obstacle is present within the predetermined range of the surroundings of the host vehicle V (S31). For example, in S31 described above, the tracking unit 21 determines whether or not the first obstacle is tracked. In a case where the first obstacle is tracked, when the position of the first obstacle in the first obstacle data is positioned within the predetermined range of the surroundings of the host vehicle V, it is determined that the tracked first obstacle is present within a predetermined range of the host vehicle V.

In a case of YES in S31 described above, the flag is set to be ON (S32). In a case of NO in S31 described above, the tracking unit 21 determines whether or not the tracked first obstacle is entering the blind spot area D within the predetermined range (S33). In a case of NO in S33 described above, the flag is set to be OFF (S34). In a case of YES in S33 described above, the flag is set to be ON (S35).

After S35 described above, the tracking unit 21 determines whether or not the tracked second obstacle has passed the blind spot area D within the predetermined range (S36). For example, in S36 described above, whether or not the second obstacle has passed the blind spot area D within the predetermined range is determined by the determination processing of passing the blind spot area D within the predetermined range described above being performed. In a case of YES in S36 described above, the flag is set to be OFF (S37). After S37 described above, the process returns to S31 described above and the processing is repeatedly executed.

Figure 8B:
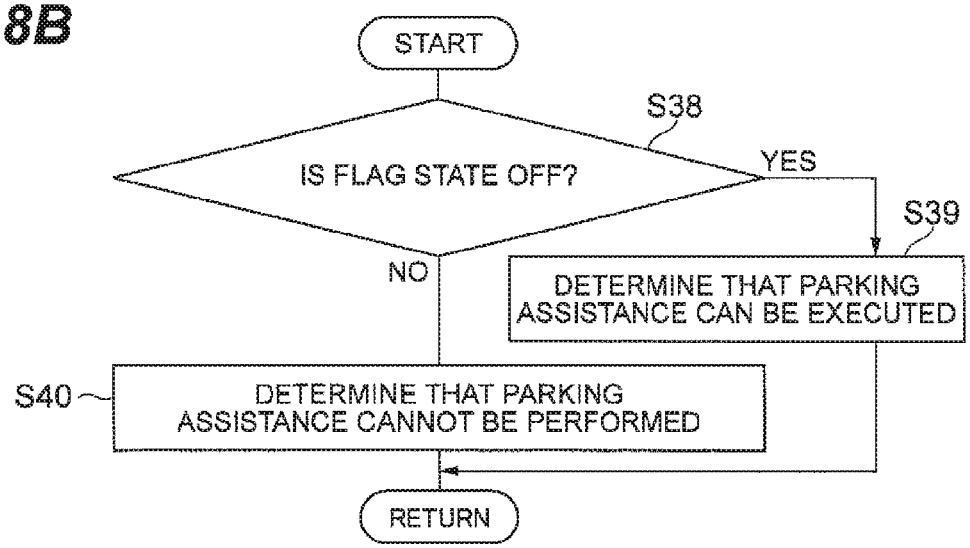
FIG. 8B is a flowchart illustrating processing of a parking determination unit in FIG. 7.

FIG. 8B is a flowchart illustrating processing of the parking determination unit 42 in FIG. 7. As illustrated in FIG. 8B, the parking determination unit 42 executes following processing. That is, it is determined whether the current state of the flag is ON or OFF (S38). In a case of YES in S38 described above, it is determined that the parking assistance can be executed (S39). In a case of NO in S38 described above, it is determined that the parking assistance cannot be performed (S40). After S40 described above, the process returns to S38 described above and the processing is repeatedly executed.

FIG. 9A and FIG. 9B are overhead views describing the drive assistance apparatus 250 in FIG. 7. In FIG. 9A and FIG. 9B, a case of ordinarily parking the host vehicle V using the drive assistance apparatus 250 is illustrated. Here, ordinary parking means autonomous parking of the host vehicle V at a target parking position O1 in which the vehicle is parked in a direction orthogonal to the travelling direction in a parking lot 61.

As illustrated in FIG. 9A, the host vehicle V is in a state of being stopped close to the target parking position O1 in order to be parked at the target parking position O1. In this state, a first another vehicle T1 travels the right side of the surroundings of the host vehicle V so as to pass the blind spot area D within the predetermined range and to overtake the host vehicle V. In the surroundings monitoring apparatus 200, due to characteristics of the detection unit 10, before entering the blind spot area D within the predetermined range, there is a possibility that the first another vehicle T1 may be erroneously detected as two obstacles, and after passing the blind spot area D within the predetermined range, there is a possibility of being correctly detected as one obstacle. In this case, the surroundings monitoring apparatus 200 continuously and erroneously recognizes that the obstacle is present in the blind spot area D within the predetermined range and the flag is set to be ON. The vehicle control ECU 1 determines that, if the vehicle is steered, the vehicle may come into contact with the object in the blind spot area D within the predetermined range and that the parking assistance cannot be executed, and then, prohibits the parking assistance.

At this time, as illustrated in FIG. 9B, a second another vehicle T2 travels on the right side of the surroundings of the host vehicle V so as to pass the blind spot area D within the predetermined range to overtake the host vehicle V. For this reason, the surroundings monitoring apparatus 200 determines that the obstacle is not present in the blind spot area D within the predetermined range and the flag is set to be OFF. As a result, the vehicle control ECU 1 determines that the parking assistance can be executed, and starts the parking assistance for parking the vehicle at the target parking position O1 in a case where the parking assistance start switch in the HMI 9 is in an ON state.

Figure 10A:
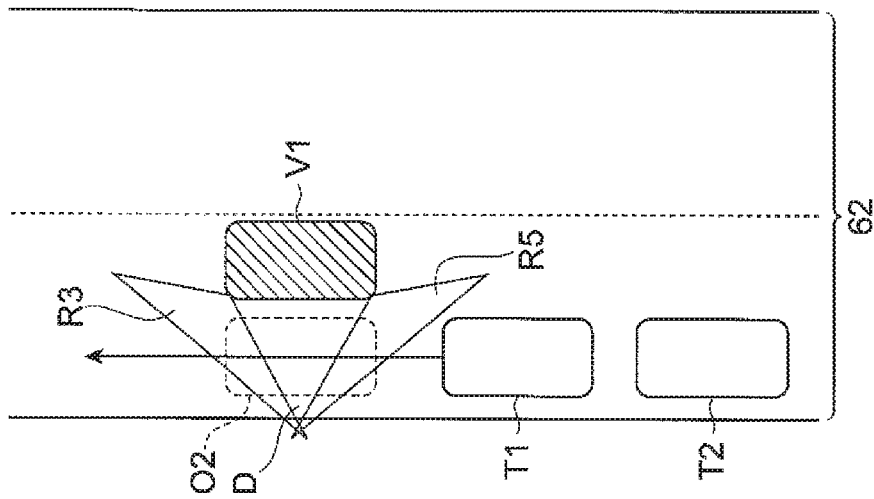
FIG. 10A and FIG. 10B are other overhead views describing the drive assistance apparatus in FIG. 7.
Figure 10B:
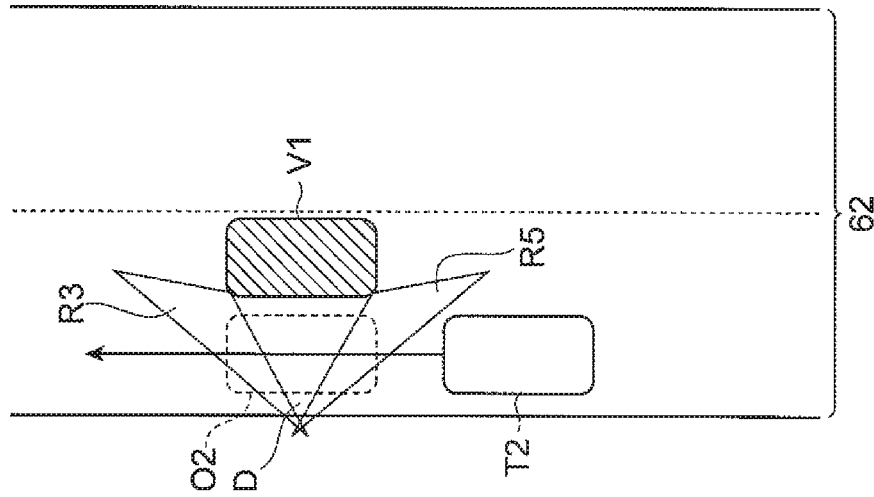

FIG. 10A and FIG. 10B are other overhead views describing the drive assistance apparatus 250 in FIG. 7. In FIG. 10A and FIG. 10B, a case of parking the host vehicle V in parallel using the drive assistance apparatus 250. Here, parallel parking means a case of autonomously parking the host vehicle V at the target parking position O2 in which the vehicle is parked on the road shoulder side in a direction along the travelling direction in a lane 62.

As illustrated in FIG. 10A, the host vehicle V is in a state of being stopped close to the target parking position O2 in order to be parked at the target parking position O2. In this state, a first another vehicle T1 travels on the left side of the surroundings of the host vehicle V so as to pass the blind spot area D within the predetermined range and to overtake the host vehicle V. In the surroundings monitoring apparatus 200, due to characteristics of the detection unit 10, before entering the blind spot area D within the predetermined range, there is a possibility that the first another vehicle T1 may be erroneously detected as two obstacles, and after passing the blind spot D area within the predetermined range, there is a possibility of being correctly detected as one obstacle. In this case, the surroundings monitoring apparatus 200 continuously and erroneously recognizes that the obstacle is present in the blind spot area within the predetermined range D and the flag is set to be ON. The vehicle control ECU 1 determines that the parking assistance cannot be executed, and then, prohibits the parking assistance.

At this time, as illustrated in FIG. 9B, a second another vehicle T2 travels on the left side of the surroundings of the host vehicle V so as to pass the blind spot area within the predetermined range D and to overtake the host vehicle V. For this reason, the surroundings monitoring apparatus 200 determines that the obstacle is not present in the blind spot area within the predetermined range D and the flag is set to be OFF. As a result, the vehicle control ECU 1 determines that the parking assistance can be executed, and starts the parking assistance for parking the vehicle at the target parking position O2 in a case where the parking assistance start switch in the HMI 9 is in an ON state.

As described above, in the surroundings monitoring apparatus 200 also, similar to the surroundings monitoring apparatus 100 described above, it is possible to avoid the problem of continuously and erroneously recognizing that the obstacle is present in the blind spot area D within the predetermined range. In addition, the drive assistance apparatus 250 includes the surroundings monitoring apparatus 200, the vehicle control ECU 1 that performs the parking assistance, and the parking determination unit 42 that determines whether or not the parking assistance can be executed. In a case where the tracking unit 21 determines that the first obstacle is entering the blind spot area D within the predetermined range, the parking determination unit 42 determines that the parking assistance cannot be executed. On the other hand, even in a case where the tracking unit 21 determines that the first obstacle is entering the blind spot area D within the predetermined range, in a case where it is determined that the second obstacle has passed the blind spot area D within the predetermined range and the first obstacle is not present in the blind spot area, the parking determination unit 42 determines that the parking assistance can be executed. In a case where it is determined that the parking assistance cannot be executed, the vehicle control ECU 1 prohibits the parking assistance. In a case where it is determined that the parking assistance can be executed and in a case where the parking assistance start switch is in the ON state and the host vehicle V is stopped, the vehicle control ECU 1 executes the parking assistance. In this way, it is possible to suppress the unnecessary prohibition of the parking assistance.

As described above, the embodiments of the present invention are described. However, the present invention is not limited to the embodiments described above, and can be embodied in various forms.

In the first embodiment described above, the surroundings monitoring apparatus 100 applied, to the lane change assistance is described. In the second embodiment described above, the surroundings monitoring apparatus 200 applied to the parking assistance is described. The surroundings monitoring apparatus in the present invention can be applied to various assistances such as operation assistance, travel assistance, and safety assistance. For example, the surroundings monitoring apparatus in the present invention can also be applied to a pre-crash safety, an adaptive cruise control, an auto-pilot, and the like.

In the embodiments described above, when it is determined that the second obstacle has passed the blind spot area D, the flag is set to be OFF and it is determined that the first obstacle is not present blind spot area D. The processing may be performed by determining that the first obstacle is not present in the blind spot area D using a known method in which such the flag processing or the determination processing is not executed. In short, it is sufficient that, in a case where the tracked first obstacle is entering the blind spot area D and when the tracked second obstacle has passed the blind spot area D, the tracking unit may treat the first obstacle as not being present in the blind spot area D.

In the embodiments described above, the functions of the tracking unit 21, the lane changeability determination unit 22, and the parking determination unit 42 may be performed by a computer in a facility such as an information processing center which is capable of communicating with the host vehicle V. The lane changeability determination unit 22 may be included in the surroundings monitoring ECU 20. The parking determination unit 23 may be included in the surroundings monitoring ECU 20.

In the first embodiment described above, the vehicle control unit executes a direct assistance (to autonomously change the lane in which the host vehicle V travels) as lane change assistance. However, instead of that or in addition to that, indirect assistance (for example, assistance by notifying of a timing of starting the lane change) may be executed. In the second embodiment described above, the vehicle control unit executes a direct assistance (to autonomously park the host vehicle V at the target parking position). However, instead of that or in addition to that, indirect assistance (for example, assistance by notifying of a timing of braking when parking) may be executed.

According to the present invention, it is possible to provide a surroundings monitoring apparatus and a drive assistance apparatus that can avoid the problem of continuously and erroneously recognizing that an obstacle is present in the blind spot area.

What is claimed is:

1. A surroundings monitoring apparatus comprising:
   a detection unit configured to detect information on the surroundings of a host vehicle; and
   a tracking unit configured to track a position and a speed of an obstacle in the surroundings of the host vehicle based on the result of detection by the detection unit,
   wherein the tracking unit is configured to determine whether or not, a tracked first obstacle is entering a blind spot area of the detection unit, and
   wherein, in a case where it is determined that the first obstacle is entering the blind spot area of the detection unit and when a tracked second obstacle has passed the blind spot area where the first obstacle entered, the tracking unit determines that the first obstacle is not present in the blind spot area.

2. A drive assistance apparatus comprising:
   the surroundings monitoring apparatus according to claim 1;
   a vehicle control unit configured to perform a lane change assistance for assisting the host vehicle to change lane from a current lane to an adjacent lane; and
   a lane changeability determination unit configured to determine whether or not the lane change assistance can be executed, wherein, in a case where the tracking unit determines that the first obstacle is entering the blind spot area in the adjacent lane, the lane changeability determination unit determines that the lane change assistance cannot be executed, wherein, in a case where the tracking unit determines that the second obstacle has passed the blind spot area and the first obstacle is not present in the blind spot area, the lane changeability determination unit determines that the lane change assistance can be executed, wherein, in a case where the lane changeability determination unit determines that the lane change assistance cannot be executed, the vehicle control unit prohibits the lane change assistance, and wherein, in a case where the lane changeability determination unit determines that the lane change assistance can be executed and in a case where a direction indicator at the adjacent lane side of the host vehicle is in an ON state and a lane change possibility condition is satisfied, the vehicle control unit executes the lane change assistance.

3. A drive assistance apparatus comprising:

the surroundings monitoring apparatus according to claim 1;

a vehicle control unit configured to perform a parking assistance for assisting the host vehicle to park at a target parking position; and a parking determination unit configured to determine whether or not the parking assistance can be executed, wherein, in a case where the tracking unit determines that the first obstacle is entering the blind spot area within a predetermined range set in advance in the surroundings of the host vehicle, the parking determination unit determines that the parking assistance cannot be executed, wherein, in a case where the tracking unit determines that the second obstacle has passed the blind spot area and the first obstacle is not present in the blind spot area, the parking determination unit determines that the parking assistance can be executed, wherein, in a case where the parking determination unit determines that the parking assistance cannot be executed, the vehicle control unit prohibits the parking assistance, and wherein, in a case where the parking determination unit determines that the parking assistance can be executed and in a case where a parking assistance start switch which starts the parking assistance is in the ON state and the host vehicle is in a state of being stopped, the vehicle control unit executes the parking assistance.

* * * * *